US011227517B2

(12) United States Patent
Lee et al.

(10) Patent No.: US 11,227,517 B2
(45) Date of Patent: Jan. 18, 2022

(54) VEHICLE DISPLAY DEVICE AND METHOD OF DRIVING THE SAME

(71) Applicant: Samsung Display Co., Ltd., Yongin-si (KR)

(72) Inventors: Yoon Young Lee, Asan-si (KR); Sung Chun Park, Suwon-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 16/799,520

(22) Filed: Feb. 24, 2020

(65) Prior Publication Data

US 2020/0279514 A1 Sep. 3, 2020

(30) Foreign Application Priority Data

Feb. 28, 2019 (KR) .......................... 10-2019-0024126

(51) Int. Cl.
*G09G 1/00* (2006.01)
*B60K 35/00* (2006.01)
(Continued)

(52) U.S. Cl.
CPC ............. *G09G 1/005* (2013.01); *B60K 35/00* (2013.01); *B60R 11/04* (2013.01);
(Continued)

(58) Field of Classification Search
None
See application file for complete search history.

(56) References Cited

U.S. PATENT DOCUMENTS 9,058,773 B2 6/2015 Park
9,082,343 B2 7/2015 Park
(Continued)

FOREIGN PATENT DOCUMENTS

JP 2011-110942 6/2011
KR 10-2012-0013777 2/2012
KR 10-1766077 8/2017

*Primary Examiner* — Nitin Patel
*Assistant Examiner* — Amen W Bogale
(74) *Attorney, Agent, or Firm* — H.C. Park & Associates, PLC

(57) ABSTRACT

A vehicle display device includes a first display unit disposed in a first portion of a vehicle and including a first display panel to display a first image and a first power supply to supply a first power supply voltage to the first display panel, the first power supply configured to detect an abnormality of a signal output to the first display panel to generate a first shut-down control signal; a second display unit disposed in a second portion of the vehicle and including a second display panel to display a second image and a second power supply to supply a second power supply voltage to the second display panel, the second power supply configured to detect an abnormality of a signal output to the second display panel to generate a second shut-down control signal; a third display unit disposed in a third portion of the vehicle and configured to display a third image or at least one of the first and second images; and a controller to receive first image data corresponding to the first image, second image data corresponding to the second image, and third image data corresponding to the third image to provide the received first image data, the received second image data, and the received third image data to the first display unit, the second display unit, and the third display unit, respectively. The controller is configured to supply the first image data to the third display unit in response to the first shut-down control signal, and to supply the second image data to the third (Continued)

display unit in response to the second shut-down control signal.

19 Claims, 7 Drawing Sheets

(51) Int. Cl.
*B60R 11/04* (2006.01)
*G06K 9/00* (2006.01)
*B60R 11/00* (2006.01)

(52) U.S. Cl.
CPC .... *G06K 9/00791* (2013.01); *B60R 2011/004* (2013.01); *B60R 2011/0021* (2013.01); *B60R 2300/105* (2013.01); *B60R 2300/802* (2013.01); *G09G 2330/027* (2013.01); *G09G 2330/04* (2013.01); *G09G 2330/12* (2013.01)

(56) References Cited

U.S. PATENT DOCUMENTS

| | | | |
|---|---|---|---|
| 10,198,639 B2 | 2/2019 | Sung et al. | |
| 2012/0032938 A1* | 2/2012 | Park | G09G 3/3208 345/211 |
| 2012/0293562 A1* | 11/2012 | Park | G09G 3/3233 345/690 |
| 2017/0161566 A1* | 6/2017 | Sung | B60R 1/00 |

* cited by examiner

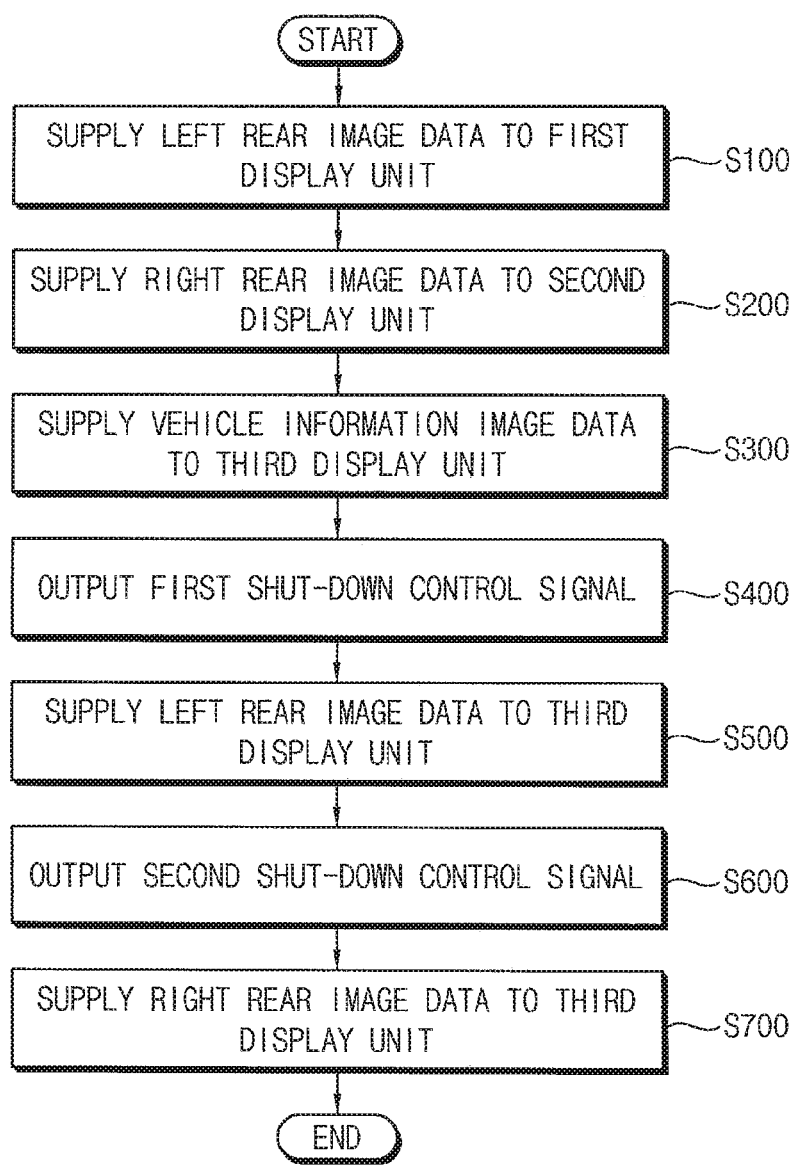

VEHICLE DISPLAY DEVICE AND METHOD OF DRIVING THE SAME

CROSS-REFERENCE TO RELATED APPLICATION

This application claims priority from and the benefit of Korean Patent Application No. 10-2019-0024126, filed on Feb. 28, 2019, which is hereby incorporated by reference for all purposes as if fully set forth herein.

BACKGROUND

Field

Exemplary implementations of the invention relate generally to display devices and, more specially, to vehicle display devices and methods of operating the vehicle display devices.

Discussion of the Background

Recently, vehicles have been developed in which cameras are mounted at both doors on outer right and left sides of the vehicles, instead of outside side-view mirrors, to output camera images through display devices mounted on right and left sides in the vehicle. Since the side-view mirrors are removed, air resistance is reduced so that fuel efficiency is improved, and noise is reduced during driving, and a field of view for a blind spot is improved by using the cameras.

The side-view display device may sense a current or a voltage output from a power supply configured to supply a power, and may shut the power supply down when an abnormality occurs in an output of the power supply to prevent the display panel from being damaged.

The above information disclosed in this Background section is only for understanding of the background of the inventive concepts, and, therefore, it may contain information that does not constitute prior art.

SUMMARY

Applicant discovered that in a case of a vehicle that displays an external image through display devices mounted on the right and left sides of the vehicle, respectively, instead of side-view mirrors, when the power supply of the display device is shut down so that the display device does not display an image, safety problems may be caused because the field of view along the right and left sides of the vehicle is not ensured.

Vehicle display devices constructed according to the principles and exemplary implementations of the invention and methods of driving such vehicle display devices provide safety during power shut-down. For example, according to some implementations of the invention, a vehicle display device that includes a first display unit to display a first image, a second display unit to display a second image, and a third display unit to display a third image shuts down a first power supply and/or a second power supply when the power supply voltage output from the first power supply and/or the second power supply is abnormal, and then displays the first image and/or the second image on the third display unit. Accordingly, even when an image is not displayed on the first display unit and/or the second display unit, the first image and/or the second image is available for the driver to check the field of view. Therefore, safety can be improved.

Additional features of the inventive concepts will be set forth in the description which follows, and in part will be apparent from the description, or may be learned by practice of the inventive concepts.

According to an aspect of the invention, a vehicle display device includes: a first display unit disposed in a first portion of a vehicle and including a first display panel to display a first image and a first power supply to supply a first power supply voltage to the first display panel, the first power supply configured to detect an abnormality of a signal output to the first display panel to generate a first shut-down control signal; a second display unit disposed in a second portion of the vehicle and including a second display panel to display a second image and a second power supply to supply a second power supply voltage to the second display panel, the second power supply configured to detect an abnormality of a signal output to the second display panel to generate a second shut-down control signal; a third display unit disposed in a third portion of the vehicle and configured to display a third image or at least one of the first and second images; and a controller to receive first image data corresponding to the first image, second image data corresponding to the second image, and third image data corresponding to the third image to provide the received first image data, the received second image data, and the received third image data to the first display unit, the second display unit, and the third display unit, respectively. The controller is configured to supply the first image data to the third display unit in response to the first shut-down control signal, and to supply the second image data to the third display unit in response to the second shut-down control signal.

The first power supply may include a first overcurrent protection circuit to detect a current from the first power supply, and to generate the first shut-down control signal when the detected current is greater than or equal to a reference current, and a first short circuit protection circuit to detect a voltage level output from the first power supply voltage, and to generate the first shut-down control signal when the detected voltage level is less than or equal to a reference voltage level.

The first power supply may be configured to output the first shut-down control signal to the controller when the first shut-down control signal is output from at least one of the first overcurrent protection circuit and the first short circuit protection circuit.

The first power supply may further include a timer to detect a time during which the first shut-down control signal is generated, and the first power supply may be configured to output the first shut-down control signal to the controller when the first shut-down control signal is detected for a predetermined reference time or more.

The second power supply may include a second overcurrent protection circuit to detect a current of the second power supply voltage output, and to generate the second shut-down control signal when the detected current is greater than or equal to a reference current, and a second short circuit protection circuit to detect a voltage level of the second power supply voltage output, and to generate the second shut-down control signal when the detected voltage level is less than or equal to a reference voltage level.

The second power supply may be configured to output the second shut-down control signal to the controller when the second shut-down control signal is output from at least one of the second overcurrent protection circuit and the second short circuit protection circuit.

The second power supply may further include a timer to detect a time during which the second shut-down control signal is generated, and the second power supply may be configured to output the second shut-down control signal to the controller when the second shut-down control signal is detected for a predetermined reference time or more.

The first power supply may be configured to shut down based on the first shut-down control signal, and the second power supply may be configured to shut down based on the second shut-down control signal.

The first image may correspond to a left rear image of the vehicle, the second image may correspond to a right rear image of the vehicle, and the third image may correspond to an information image of the vehicle.

The vehicle display device may further include a first camera disposed on a first side of an exterior of the vehicle, and configured to capture the first image to provide the first image data to the controller, and a second camera disposed on a second side of the exterior of the vehicle, and configured to capture the second image to provide the second image data to the controller.

The first image corresponding to the first image data may be displayed on the third display unit when the first shut-down control signal is supplied to the controller.

The second image corresponding to the second image data may be displayed on the third display unit when the second shut-down control signal is supplied to the controller.

The first image corresponding to the first image data and the second image corresponding to the second image data may be simultaneously displayed on the third display unit when the first shut-down control signal and the second shut-down control signal are simultaneously supplied to the controller.

According to another aspect of the invention, a method of driving a vehicle display device, the method includes the steps of: supplying first image data corresponding to a first image to a first display unit disposed in a first portion of a vehicle, supplying second image data corresponding to a second image to a second display unit disposed in a second portion of the vehicle, supplying third image data corresponding to a third image to a third display unit disposed in a third portion of the vehicle, detecting an abnormality of the first display unit to generate a first shut-down control signal, supplying the first image data to the third display unit in response to the first shut-down control signal, detecting an abnormality of the second display unit to generate a second shut-down control signal, and supplying the second image data to the third display unit in response to the second shut-down control signal.

The step of detecting the abnormality of the first display unit may further include the step of, detecting a current of a first power supply voltage output from a first power supply included in the first display unit, and detecting a voltage level of the first power supply voltage output.

The first power supply may be shut down based on the first shut-down control signal.

The step of detecting the abnormality of the second display unit may further include the step of, detecting a current of a second power supply voltage output from a second power supply included in the second display unit, and detecting a voltage level of the second power supply voltage output.

The second power supply may be shut down based on the second shut-down control signal.

The first image data may be provided by a first camera disposed on a first side of an exterior of the vehicle, and the second image data may be provided by a second camera disposed on a second side of the exterior of the vehicle.

The first image may correspond to a left rear image of the vehicle, the second image may correspond to a right rear image of the vehicle, and the third image may correspond to an information image of the vehicle.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the inventive concepts.

FIG. 7 is a flowchart of a method of driving a vehicle display device according to an exemplary embodiment of the invention.

DETAILED DESCRIPTION

Figure 1:
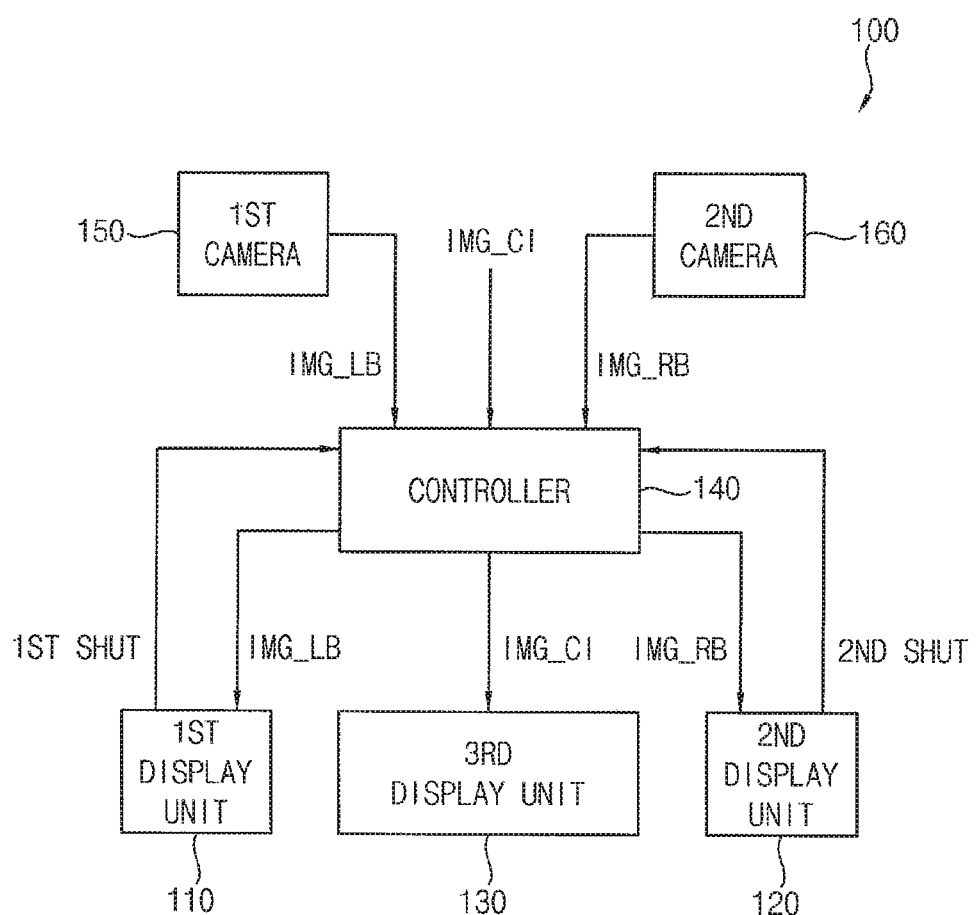
FIG. 1 is a block diagram of an exemplary embodiment of vehicle display device constructed according to the principles of the invention.

In the following description, for the purposes of explanation, numerous specific details are set forth in order to provide a thorough understanding of various exemplary embodiments or implementations of the invention. As used herein "embodiments" and "implementations" are interchangeable words that are non-limiting examples of devices or methods employing one or more of the inventive concepts disclosed herein. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be used or implemented in another exemplary embodiment without departing from the inventive concepts.

Unless otherwise specified, the illustrated exemplary embodiments are to be understood as providing exemplary features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the D1-axis, the D2-axis, and the D3-axis are not limited to three axes of a rectangular coordinate system, such as the x, y, and z-axes, and may be interpreted in a broader sense. For example, the D1-axis, the D2-axis, and the D3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

Figure 2:
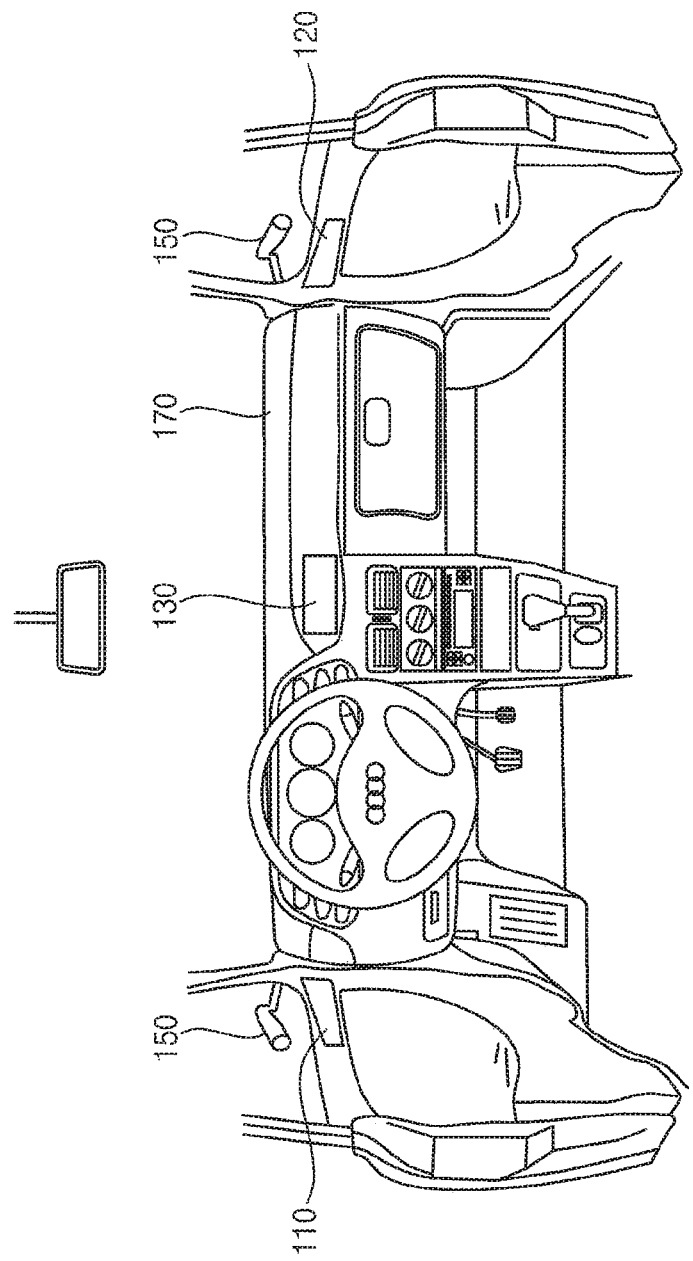
FIG. 2 is a perspective view showing an exemplary embodiment of an interior of a vehicle including the vehicle display device of FIG. 1.

FIG. 1 is a block diagram of an exemplary embodiment of vehicle display device constructed according to the principles of the invention, and FIG. 2 is a perspective view showing an exemplary embodiment of an interior of a vehicle including the vehicle display device of FIG. 1.

Referring to FIG. 1, a vehicle display device 100 may include a first display unit 110, a second display unit 120, a third display unit 130, and a controller 140. The vehicle display device 100 may further include a first camera 150 and a second camera 160. The first display unit 110 may be disposed in a first portion of a vehicle, the second display unit 120 may be disposed in a second portion of the vehicle, and the third display unit 130 may be disposed in a third portion of the vehicle. For example, as shown in FIG. 2, the first display unit 110 may be disposed on the left side of an in-vehicle dashboard 170 or as shown in FIG. 2 on the left (e.g., driver's side) door, the second display unit 120 may be disposed on the right side of the in-vehicle dashboard 170 or as shown in FIG. 2 on the right (e.g., passenger's side) door, and the third display unit 130 may be disposed at a center of the in-vehicle dashboard 170. In addition, the first camera 150 may be disposed on the left (driver) side of an exterior of the vehicle in a position similar to as standard side-view mirror, and the second camera 160 may be disposed on the right (passenger) side of the exterior of the vehicle in a position similar to as standard side-view mirror.

The first camera 150 may be disposed on a first side of the exterior of the vehicle, and may capture a first image to provide first image data IMG_LB to the controller 140. The controller 140 may supply the first image data IMG_LB to the first display unit 110. For example, the first camera 150 may be disposed on the left side of the exterior of the vehicle, and may capture a left rear image of the vehicle. In this case, instead of a left side-view mirror, the first display unit 110 may display the left rear image corresponding to the first image data IMG_LB.

The second camera 160 may be disposed on a second side of the exterior of the vehicle, and may capture a second image to provide second image data IMG_RB to the controller 140. The controller 140 may supply the second image data IMG_RB to the second display unit 120. For example, the second camera 160 may be disposed on the right side of the exterior of the vehicle, and may capture a right rear image of the vehicle. In this case, instead of a right side-view mirror, the second display unit 120 may display the right rear image corresponding to the second image data IMG_RB.

FIG. 2 shows the first camera 150 and the second camera 160 disposed at the exterior of the vehicle on lateral sides of the driver's seat and a passenger's seat, but positions of the first camera 150 and the second camera 160 are not limited thereto. For example, the first camera 150 and the second camera 160 may be installed at front, rear, upper, and lower portions of the vehicle to provide the first and second images corresponding to respective positions to the controller 140.

The third display unit 130 may display third image data IMG_CI corresponding to the third image. The third image may be changed according to a function set by a driver. For example, the third image may be an image representing various vehicle information such as a navigation screen, a music reproduction screen, a radio frequency screen, a vehicle rear image, a vehicle front image, or the like. The controller 140 may provide the third image data IMG_CI corresponding to the third image to the third display unit 130. The third display unit 130 may display the third image corresponding to the third image data IMG_CI.

Figure 3:
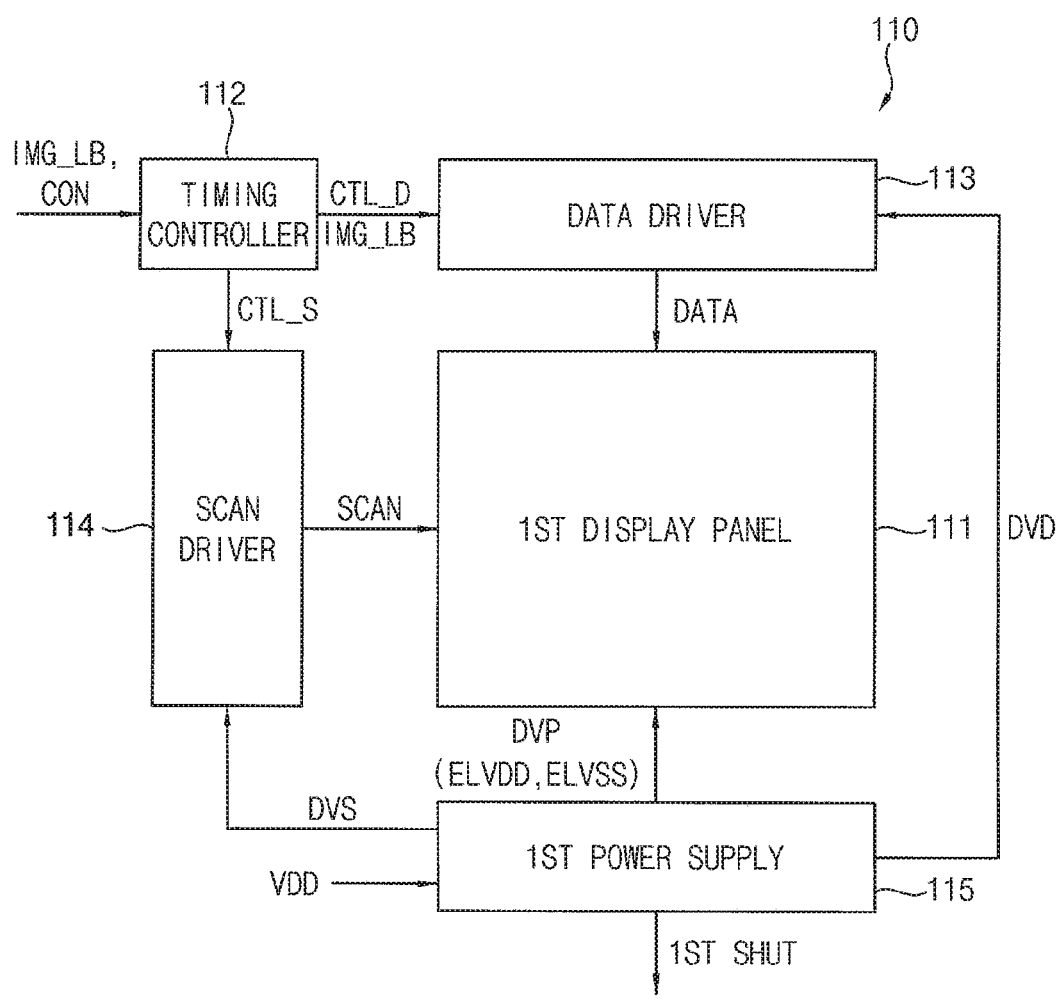
FIG. 3 is a block diagram of an exemplary embodiment of a first display unit in the vehicle display device of FIG. 1.

The first display unit 110 may include a first display panel 111 shown in FIG. 3 and a first power supply 115 shown in FIG. 3, in which the first power supply may detect an abnormality of a signal output to the first display panel to output a first shut-down control signal 1ST SHUT. The first power supply may detect a signal output from the first power supply to the first display panel. For example, the first power supply may detect a current or a voltage output to the first display panel. The first power supply may output the first shut-down control signal 1ST SHUT when the current or the voltage is abnormal. The first power supply may be shut down in response to the first shut-down control signal 1ST SHUT. In one exemplary embodiment, the first power supply may include an overcurrent protection circuit (OCP circuit) 210 shown in FIGS. 4A and 4B for detecting a current output to the first display panel and shutting the first power supply down when the current is greater than or equal to a reference current. In another exemplary embodiment, the first power supply may include a short circuit protection circuit (SCP circuit) 220 shown in FIGS. 4A and 4B for detecting a voltage output to the first display panel and shutting the first power supply down when the voltage is less than or equal to a reference voltage. When the first power supply is shut down, power is not supplied to the first display panel, so that an image may not be displayed on the first display unit 110. The controller 140 may supply the first image data IMG_LB, which is supplied from the first camera 150, to the third display unit 130 in response to the first shut-down control signal 1ST SHUT. The third display unit 130 may display the first image corresponding to the first image data IMG_LB. Alternatively, the third display unit 130 may simultaneously display the first image and the third image by using a split-screen or pop-up function.

Figure 5:
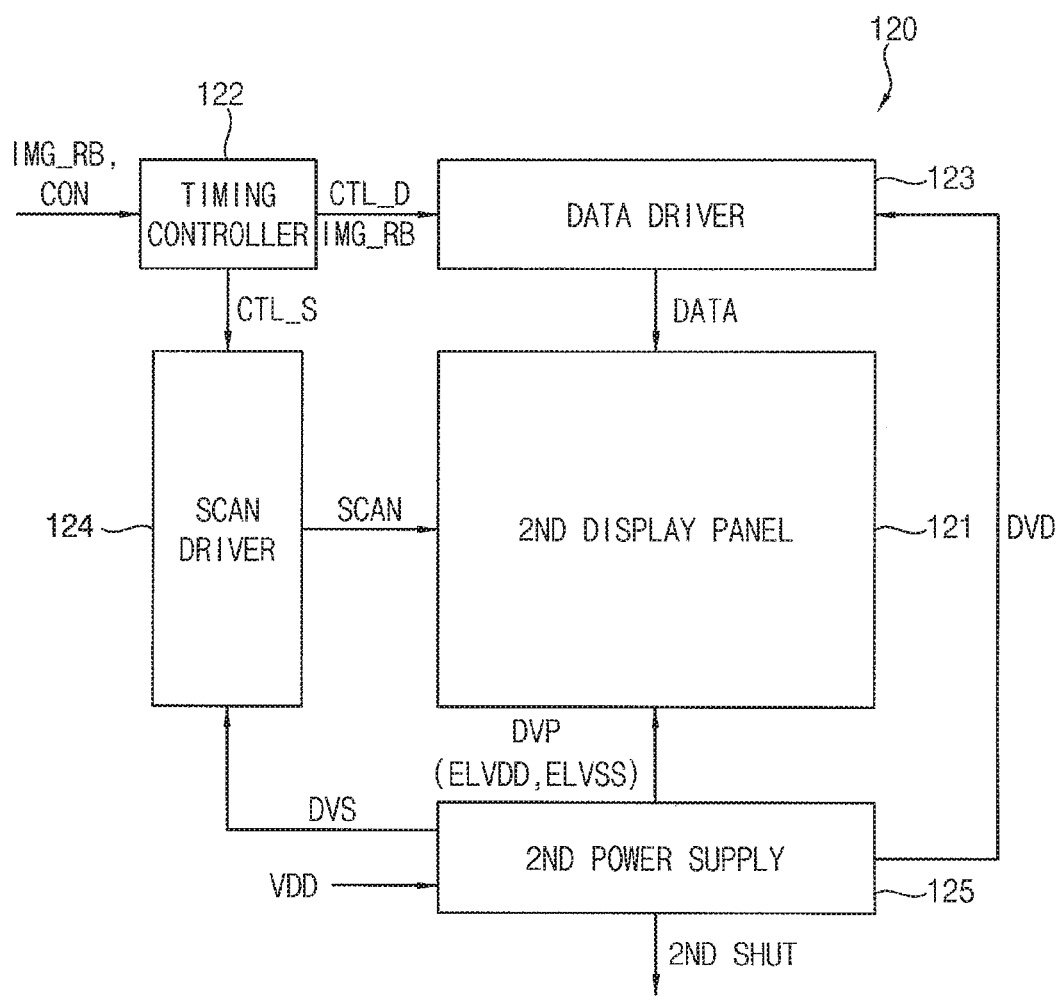
FIG. 5 is a block diagram of an exemplary embodiment of a second display unit in the vehicle display device of FIG. 1.

The second display unit 120 may include a second display panel 121 shown in FIG. 5 and a second power supply 125 shown in FIG. 5, in which the second power supply may detect an abnormality of a signal output to the second display panel to output a second shut-down control signal 2ND SHUT. The second power supply may detect a signal output from the second power supply to the second display panel. For example, the second power supply may detect a current or a voltage output to the second display panel. The second power supply may output the second shut-down control signal 2ND SHUT when the current or the voltage is abnormal. The second power supply may be shut down in response to the second shut-down control signal 2ND SHUT. In one exemplary embodiment, the second power supply may include an OCP circuit 310 shown in FIGS. 6A and 6B for detecting a current output to the second display panel and shutting the second power supply down when the current is greater than or equal to a reference current. In another exemplary embodiment, the second power supply may include an SCP circuit 320 shown in FIGS. 6A and 6B for detecting a voltage output to the second display panel and shutting the second power supply down when the voltage is less than or equal to a reference voltage. When the second power supply is shut down, power is not supplied to the second display panel, so that an image may not be displayed on the second display unit 120. The controller 140 may supply the second image data IMG_RB, which is supplied from the second camera 160, to the third display unit 130 in response to the second shut-down control signal 2ND SHUT. The third display unit 130 may display the second image corresponding to the second image data IMG_RB. Alternatively, the third display unit 130 may simultaneously display the second image and the third image by using the split-screen or pop-up function.

When the first shut-down control signal 1ST SHUT and the second shut-down control signal 2ND SHUT are simultaneously supplied, the controller 140 may simultaneously supply the first image data IMG_LB and the image display data IMG_RB to the third display unit 130. The third display unit 130 may simultaneously display the first image corresponding to the first image data IMG_LB and the second image corresponding to the second image data IMG_RB by splitting the screen. For example, the third display unit 130 may vertically split the screen to display the first image on a left screen and display the second image on a right screen.

As described above, the vehicle display device 100 according to exemplary embodiments includes the first display unit 110 for displaying the first image, the second display unit 120 for displaying the second image, and the third display unit 130 for displaying the third image, wherein the first power supply and/or the second power supply are shut down when power supply voltages output from the first power supply of the first display unit 110 and/or the second power supply of the second display unit 120 are abnormal, so that the first display panel and/or the second display panel can be prevented from being damaged. In addition, the first image and/or the second image is displayed on the third display unit 130 when the first power supply of the first display unit 110 and/or the second power supply of the second display unit 120 is shut down, so that the driver may check the first image and/or the second image to ensure the field of view even when an image is not displayed on the first display unit 110 and/or the second display unit 120. Therefore, the safety can be improved.

Figure 4A:
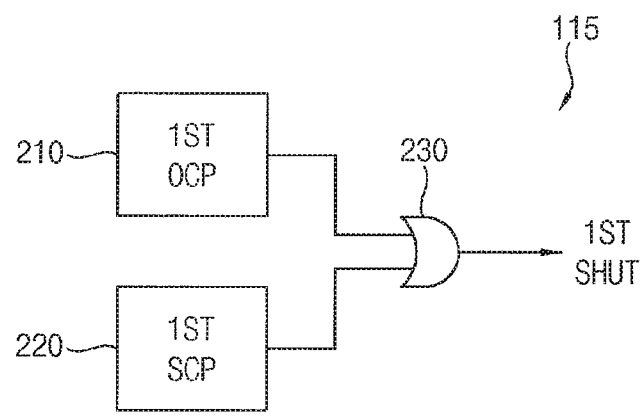
FIG. 4A is a block diagram of an exemplary embodiment of a first power supply in the first display unit of FIG. 3.
Figure 4B:
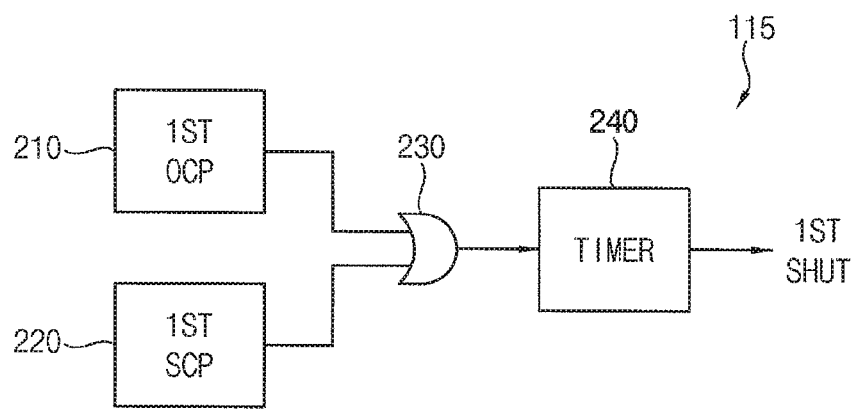
FIG. 4B is a block diagram of another exemplary embodiment of a first power supply in the first display unit of FIG. 3.

FIG. 3 is a block diagram of an exemplary embodiment of a first display unit in the vehicle display device of FIG. 1. FIG. 4A is a block diagram of an exemplary embodiment of a first power supply in the first display unit of FIG. 3. FIG. 4B is a block diagram of another exemplary embodiment of the first power supply in the first display unit of FIG. 3.

Referring to FIG. 3, the first display unit 110 may include a first display panel 111, a first power supply 115, a timing controller 112, a data driver 113, and a scan driver 114.

The first display panel 111 may include data lines, scan lines, and a plurality of pixels. The data lines may be generally parallel to a long side of the first display panel 111, and the scan lines may be generally parallel to a short side of the first display panel 111. Each of the pixels may be formed in a region where the data lines cross the scan lines. In one exemplary embodiment, each of the pixels may include a thin film transistor electrically connected to the data line and the scan line, a liquid crystal capacitor connected to the thin film transistor, and a storage capacitor. Therefore, the first display panel 111 may be a liquid crystal display panel, and the first display unit may be a liquid crystal display device. In another exemplary embodiment, each of the pixels may include a thin film transistor electrically connected to the data line and the scan line, a storage capacitor connected to the thin film transistor, a driving transistor connected to the storage capacitor, and an organic light emitting diode connected to the driving transistor. Accordingly, the first display panel 111 may be an organic light emitting diode display panel, and the first display unit may be an organic light emitting diode display device.

The first power supply 115 may receive a direct current power supply VDD from an outside to generate a plurality of voltages required for operating the first display panel 111. For example, the first power supply 115 may generate a power supply voltage DVP supplied to the first display panel 111, a data driving voltage DVD supplied to the data driver 113, and a scan driving voltage DVS supplied to the scan driver 114. The power supply voltage DVP may include a first power supply voltage ELVDD and a second power supply voltage ELVSS provided to a first electrode and a second electrode of an organic light emitting diode which is included in the pixel formed on the first display panel 111. The data driving voltage DVD may include an analog driving voltage for generating a data signal DATA, a digital driving voltage, etc. The scan driving voltage DVS may include an on-voltage and an off-voltage for generating a scan signal SCAN.

Referring to FIGS. 4A and 4B, the first power supply 115 may include a first overcurrent protection circuit 210 and a first short circuit protection circuit 220. The first overcurrent protection circuit 210 may detect the current of the power supply voltage DVP output from the first power supply 115, and may output the first shut-down control signal 1ST SHUT when the detected current is greater than or equal to a predetermined reference current. For example, the first overcurrent protection circuit 210 may detect a current flowing in a load between the first power supply voltage ELVDD and the second power supply voltage ELVSS, and may output the first shut-down control signal 1ST SHUT when the current is greater than or equal to the reference current. The first short circuit protection circuit 220 may detect a voltage level of the power supply voltage DVP output from the first power supply 115, and may output the first shut-down control signal 1ST SHUT when the detected voltage level is less than or equal to a reference voltage level. For example, the first short circuit protection circuit 220 may include a comparator for comparing the power supply voltage DVP output from the first power supply 115 with the reference voltage, and may output the first shut-down control signal 1ST SHUT according to an output of the comparator. The first power supply 115 is shut down in response to the first shut-down control signal 1ST SHUT, so that the first display panel 111 can be prevented from being damaged due to an abnormal signal. In addition, the first power supply 115 may output the first shut-down control signal 1ST SHUT to the controller.

Referring to FIG. 4A, the first power supply 115 may include an OR gate 230. The first overcurrent protection circuit 210 and the first short circuit protection circuit 220 may be connected to each other through the OR gate 230. In other words, when the first shut-down control signal 1ST SHUT is output from at least one of the first overcurrent protection circuit 210 and the first short circuit protection circuit 220, the first power supply 115 may output the first shut-down control signal 1ST SHUT.

Referring to FIG. 4B, the first power supply 115 may include an OR gate 230 and a timer 240. The first overcurrent protection circuit 210 and the first short circuit protection circuit 220 may be connected to each other through the OR gate 230. In other words, when the first shut-down control signal 1ST SHUT is output from at least one of the first overcurrent protection circuit 210 and the first short circuit protection circuit 220, the first shut-down control signal 1ST SHUT may be provided to the timer 240. The timer 240 may detect a time during which the first shut-down control signal 1ST SHUT is output. The timer 240 may output the first shut-down control signal 1ST SHUT when the first shut-down control signal 1ST SHUT is detected for a predetermined reference time or greater. For example, when an overcurrent or a short circuit is caused by a temporary abnormal signal, the first power supply 115 may operate normally after a predetermined time. The first shut-down control signal 1ST SHUT is output by using the timer 240 when the first shut-down control signal 1ST SHUT is detected for the reference time or more, so that the first display unit 110 can be prevented from being stopped caused by the temporary abnormal signal.

The timing controller 112 may receive a control signal CON provided from an external device and the first image data IMG_LB provided from the first camera. The timing controller 112 may generate a scan control signal CTL_S for controlling the scan driver 114 and a data control signal CTL_D for controlling the data driver 113 based on the control signal CON. For example, the scan control signal CTL_S may include a vertical start signal and a scan clock signal, and the data control signal CTL_D may include a horizontal start signal and a data clock signal. The timing controller 112 may output the scan control signal CTL_S to the scan driver 114, and may output the data control signal CTL_D to the data driver 113. In addition, the timing controller 112 may output the first image data IMG_LB to the data driver 113, or may apply an algorithm for calibrating the image quality of the first image data IMG_LB to the first image data IMG_LB to output the enhanced first image data IMG_LB to the data driver 113.

The data driver 113 may supply the data signal DATA to the pixels formed on the first display panel 111 through the data lines. The data driver 113 may generate a data signal DATA corresponding to the first image data IMG_LB based on the data control signal CTL_D and the first image data IMG_LB supplied from the timing controller 112.

The scan driver 114 may supply the scan signal SCAN to the pixels formed on the first display panel 111 through the scan lines. The scan driver 114 may generate a scan signal SCAN based on the scan control signal CTL_S supplied from the timing controller 112.

As described above, the first display unit 110 includes the first power supply 115 including the first overcurrent protection circuit 210 and the first short circuit protection circuit 220, and outputs the first shut-down control signal 1ST SHUT when the first shut-down control signal 1ST SHUT is output from at least one of the first overcurrent protection circuit 210 and the first short circuit protection circuit 220, so that the first display panel 111 can be prevented from being damaged due to an abnormal signal.

Figure 6A:
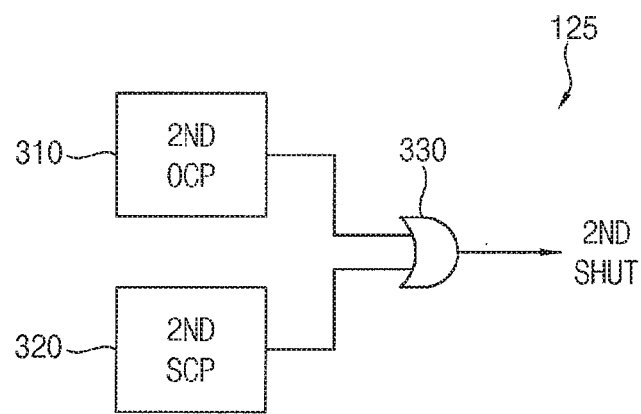
FIG. 6A is a block diagram of an exemplary embodiment of a second power supply in the second display unit of FIG. 5.
Figure 6B:
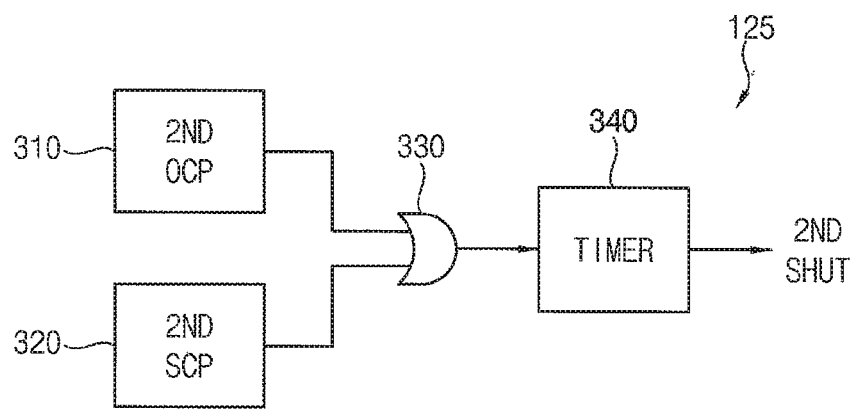
FIG. 6B is a block diagram of another exemplary embodiment of a second power supply in the second display unit of FIG. 5.

FIG. 5 is a block diagram of an exemplary embodiment of a second display unit in the vehicle display device of FIG. 1. FIG. 6A is a block diagram of an exemplary embodiment of a second power supply in the second display unit of FIG. 5. FIG. 6B is a block diagram of another exemplary embodiment of the second power supply in the second display unit of FIG. 5.

Referring to FIG. 5, the second display unit 120 may include a second display panel 121, a second power supply 125, a timing controller 122, a data driver 123, and a scan driver 124.

The second display panel 121 may include data lines, scan lines, and a plurality of pixels. The data lines may be generally parallel to a long side of the second display panel 121, and the scan lines may be generally parallel to a short side of the second display panel 121. Each of the pixels may be formed in a region where the data lines cross the scan lines. In one exemplary embodiment, each of the pixels may include a thin film transistor electrically connected to the data line and the scan line, a liquid crystal capacitor connected to the thin film transistor, and a storage capacitor. Therefore, the second display panel 121 may be a liquid crystal display panel, and the second display unit may be a liquid crystal display device. In another exemplary embodiment, each of the pixels may include a thin film transistor electrically connected to the data line and the scan line, a storage capacitor connected to the thin film transistor, a driving transistor connected to the storage capacitor, and an organic light emitting diode connected to the driving transistor. Accordingly, the second display panel 121 may be an organic light emitting diode display panel, and the second display unit may be an organic light emitting diode display device.

The second power supply 125 may receive a direct current power supply VDD from an outside to generate a plurality of voltages required for operating the second display panel 121. For example, the second power supply 125 may generate a power supply voltage DVP supplied to the second display panel 121, a data driving voltage DVD supplied to the data driver 123, and a scan driving voltage DVS supplied to the scan driver 124. The power supply voltage DVP may include a first power supply voltage ELVDD and a second power supply voltage ELVSS provided to a first electrode and a second electrode of an organic light emitting diode which is included in the pixel formed on the second display panel 121. The data driving voltage DVD may include an analog driving voltage for generating a data signal DATA, a digital driving voltage, etc. The scan driving voltage DVS may include an on-voltage and an off-voltage for generating a scan signal SCAN.

Referring to FIGS. 6A and 6B, the second power supply 125 may include a second overcurrent protection circuit 310 and a second short circuit protection circuit 320. The second overcurrent protection circuit 310 may detect the current of the power supply voltage DVP output from the second power supply 125, and may output the second shut-down control signal 2ND SHUT when the detected current is greater than or equal to a predetermined reference current. For example, the second overcurrent protection circuit 310 may detect a current flowing in a load between the first power supply voltage ELVDD and the second power supply voltage ELVSS, and may output the second shut-down control signal 2ND SHUT when the current is greater than or equal to the reference current. The second short circuit protection circuit 320 may detect a voltage level of the power supply voltage DVP output from the second power supply 125, and may output the second shut-down control signal 2ND SHUT when the detected voltage level is less than or equal to a reference voltage level. For example, the second short circuit protection circuit 320 may include a comparator for comparing the power supply voltage DVP output from the second power supply 125 with the reference voltage, and may output the second shut-down control signal 2ND SHUT according to an output of the comparator. The second power supply 125 is shut down in response to the second shut-down control signal 2ND SHUT, so that the second display panel 121 can be prevented from being damaged due to an abnormal signal. In addition, the second power supply 125 may output the second shut-down control signal 2ND SHUT to the controller.

Referring to FIG. 6A, the second power supply 125 may include an OR gate 330. The second overcurrent protection circuit 310 and the second short circuit protection circuit 320 may be connected to each other through the OR gate 330. In other words, when the second shut-down control signal 2ND SHUT is output from at least one of the second overcurrent protection circuit 310 and the second short circuit protection circuit 320, the second power supply 125 may output the second shut-down control signal 2ND SHUT.

Referring to FIG. 6B, the second power supply 125 may include an OR gate 330 and a timer 340. The second overcurrent protection circuit 310 and the second short circuit protection circuit 320 may be connected to each other through the OR gate 330. In other words, when the second shut-down control signal 2ND SHUT is output from at least one of the second overcurrent protection circuit 310 and the second short circuit protection circuit 320, the second shut-down control signal 2ND SHUT may be provided to the timer 340. The timer 340 may detect a time during which the second shut-down control signal 2ND SHUT is output. The timer 340 may output the second shut-down control signal 2ND SHUT when the second shut-down control signal 2ND SHUT is detected for a predetermined reference time or more. For example, when an overcurrent or a short circuit is caused by a temporary abnormal signal, the second power supply 125 may operate normally after a predetermined time. The second shut-down control signal 2ND SHUT is output by using the timer 340 when the second shut-down control signal 2ND SHUT is detected for the reference time or more, so that the second display unit 120 can be prevented from being stopped caused by the temporary abnormal signal.

The timing controller 122 may receive a control signal CON provided from an external device and the second image data IMG_RB provided from the second camera. The timing controller 122 may generate a scan control signal CTL_S for controlling the scan driver 124 and a data control signal CTL_D for controlling the data driver 123 based on the control signal CON. For example, the scan control signal CTL_S may include a vertical start signal and a scan clock signal, and the data control signal CTL_D may include a horizontal start signal and a data clock signal. The timing controller 122 may output the scan control signal CTL_S to the scan driver 124, and may output the data control signal CTL_D to the data driver 123. In addition, the timing controller 122 may output the second image data IMG_RB to the data driver 123, or may apply an algorithm for calibrating the image quality of the second image data IMG_RB to the second image data IMG_RB to output the enhanced second image data IMG_RB to the data driver 123.

The data driver 123 may supply the data signal DATA to the pixels formed on the second display panel 121 through the data lines. The data driver 123 may generate a data signal DATA corresponding to the second image data IMG_RB based on the data control signal CTL_D and the second image data IMG_RB supplied from the timing controller 122.

The scan driver 124 may supply the scan signal SCAN to the pixels formed on the second display panel 121 through the scan lines. The scan driver 124 may generate a scan signal SCAN based on the scan control signal CTL_S supplied from the timing controller 122.

As described above, the second display unit 120 includes the second power supply 125 including the second overcurrent protection circuit 310 and the second short circuit protection circuit 320, and outputs the second shut-down control signal 2ND SHUT when the second shut-down control signal 2ND SHUT is output from at least one of the second overcurrent protection circuit 310 and the second short circuit protection circuit 320, so that the second display panel 121 can be prevented from being damaged due to an abnormal signal.

FIG. 7 is a flowchart of a method of driving a vehicle display device according to an exemplary embodiment of the invention.

Referring to FIG. 7, the method of driving the vehicle display device may include the steps of: supplying first image data corresponding to a first image to a first display unit (S100); supplying second image data corresponding to a second image to a second display unit (S200); supplying third image data corresponding to a third image to a third display unit (S300); outputting a first shut-down control signal by detecting an abnormality of the first display unit (S400); providing the first image data to the third display unit (S500); outputting a second shut-down control signal by detecting an abnormality of the second display unit (S600); and providing the second image data to the third display unit (S700).

The method of driving the vehicle display device may include the step of supplying of the first image data IMG_LB shown in FIG. 1 to the first display unit 110 shown in FIG. 2 disposed in a first portion of a vehicle (S100). The vehicle display device may include a first camera 150 shown in FIG. 2 disposed on a first side of an exterior of the vehicle. The first camera may capture the first image of the exterior of the vehicle to provide the first image data to the controller 140 shown in FIG. 1 of the vehicle display device. The controller may supply the first image data to the first display unit. For example, the first camera may be disposed on the left (driver) side of the exterior of the vehicle to capture a left rear image of the vehicle, and the first display unit may be disposed on the left side of an in-vehicle dashboard. In this case, instead of a left side-view mirror, the first display unit may display the left rear image corresponding to the first image data.

The method of driving the vehicle display device may include the step of supplying of the second image data IMG_RB shown in FIG. 1 to the second display unit 120 shown in FIG. 2 disposed in a second portion of the vehicle (S200). The vehicle display device may include a second camera 150 shown in FIG. 2 disposed on a second side of the exterior of the vehicle. The second camera may capture the second image of the exterior of the vehicle to provide the second image data to the controller of the vehicle display device. The controller may supply the second image data to the second display unit. For example, the second camera may be disposed on the right (passenger) side of the vehicle to capture a right rear image of the vehicle, and the second display unit may be disposed on a right side of the in-vehicle dashboard. In this case, instead of a right side-view mirror, the second display unit may display the right rear image corresponding to the second image data.

The method of driving the vehicle display device may include the step of supplying of the third image data IMG_CI shown in FIG. 1 to the third display unit 130 of FIG. 2 disposed in a third portion of the vehicle (S300). The third image may be changed according to a function set by a driver. For example, the third image may be an image representing various vehicle information such as a navigation screen, a music reproduction screen, a radio frequency screen, a vehicle rear image, and a vehicle front image. The controller of the vehicle display device may provide the third image data corresponding to the third image to the third display unit. For example, the third display unit may be disposed at a center of the in-vehicle dashboard. The third display unit may display the third image corresponding to the third image data.

The method of driving the vehicle display device may include the step of outputting of the first shut-down control signal 1ST SHUT shown in FIGS. 1 and 3 by detecting the abnormality of the first display unit (S400). The first display unit may include a first display panel 111 of FIG. 3 and a first power supply 115 of FIG. 3. The first power supply may detect a signal output from the first power supply to the first display panel. The first power supply may detect a current of a power supply voltage output to the first display panel. When the detected current is greater than or equal to a reference current, the first power supply may determine that the power supply voltage is an abnormal signal. In addition, the first power supply may detect a voltage of the power supply voltage output to the first display panel. When the detected voltage is less than or equal to a reference voltage, the first power supply may determine that the power supply voltage is an abnormal signal. The first power supply may output the first shut-down control signal when the power supply voltage is determined as an abnormal signal. For example, the first power supply may include an overcurrent protection circuit (OCP circuit) 210 shown in FIGS. 4A and 4B and a short circuit protection circuit (SCP circuit) 220 shown in FIGS. 4A and 4B, and may output the first shut-down control signal when one of the overcurrent protection circuit and the short circuit protection circuit is abnormal. At this time, the first power supply may be shut down based on the first shut-down control signal. In other words, an image may not be displayed on the first display unit.

The method of driving the vehicle display device may include the step of supplying of the first image data to the third display unit in response to the first shut-down control signal (S500). The controller of the vehicle display device may provide the first image data to the third display unit in response to the first shut-down control signal. The third display unit may display the first image corresponding to the first image data. Alternatively, the third display unit may simultaneously display the first image and the third image by using a split-screen or pop-up function.

The method of driving the vehicle display device may include the step of outputting of the second shut-down control signal 2ND SHUT shown in FIGS. 1 and 5 by detecting the abnormality of the second display unit (S600). The second display unit may include a second display panel and a second power supply. The second power supply may detect a signal output from the second power supply to the second display panel. The second power supply may detect a current of a power supply voltage output to the second display panel. When the detected current is greater than or equal to a reference current, the second power supply may determine that the power supply voltage is an abnormal signal. In addition, the second power supply may detect a voltage of the power supply voltage output to the second display panel. When the detected voltage is less than or equal to a reference voltage, the second power supply may determine that the power supply voltage is an abnormal signal. The second power supply may output the second shut-down control signal when the power supply voltage is determined as an abnormal signal. For example, the second power supply may include an overcurrent protection circuit (OCP circuit) 310 shown in FIGS. 6A and 6B and a short circuit protection circuit (SCP circuit) 320 shown in FIGS. 6A and 6B, and may output the second shut-down control signal when one of the overcurrent protection circuit and the short circuit protection circuit is abnormal. At this time, the second power supply may be shut down based on the second shut-down control signal. In other words, an image may not be displayed on the second display unit.

The method of driving the vehicle display device may include the step of supplying of the second image data to the third display unit in response to the second shut-down control signal (S700). The controller of the vehicle display device may provide the second image data to the third display unit in response to the second shut-down control signal. The third display unit may display the second image corresponding to the second image data. Alternatively, the third display unit may simultaneously display the second image and the third image by using the split-screen or pop-up function.

In addition, when the first shut-down control signal and the second shut-down control signal are simultaneously provided, the controller of the vehicle display device may simultaneously supply the first image data and the image display data to the third display unit. The third display unit may simultaneously display the first image corresponding to the first image data and the second image corresponding to the second image data by splitting the screen.

As described above, in the method of driving the vehicle display device according to exemplary embodiments, abnormalities of the first display unit and/or the second display unit are detected, and the first display unit and/or the second display unit are shut down when the power supply voltages of the first display unit and the second display unit are abnormal, so that the first display unit and the second display unit can be prevented from being damaged. In addition, the first image or the second image is displayed on the third display unit when the first display unit or the second display unit is shut down, so that the driver may check the first image and the second image to ensure the field of view even when an image is not displayed on the first display unit or the second display unit. Therefore, the safety can be improved.

The inventive concepts may be applied to any electronic device including a display device. For example, the inventive concepts may be applied to a digital television (TV), a 3D TV, a smart phone, a tablet computer, a mobile phone, a personal computer (PC), a home appliance, a laptop computer, etc.

Although certain exemplary embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:

1. A vehicle display device comprising:
    a first display unit disposed in a first portion of a vehicle and including a first display panel to display a first image and a first power supply to supply a first power supply voltage to the first display panel, the first power supply configured to detect an abnormality of a signal output to the first display panel to generate a first shut-down control signal;
    a second display unit disposed in a second portion of the vehicle and including a second display panel to display a second image and a second power supply to supply a second power supply voltage to the second display panel, the second power supply configured to detect an abnormality of a signal output to the second display panel to generate a second shut-down control signal;
    a third display unit disposed in a third portion of the vehicle and configured to display a third image or at least one of the first and second images;
    a controller to receive first image data corresponding to the first image, second image data corresponding to the second image, and third image data corresponding to the third image to provide the first image data, the second image data, and the third image data to the first display unit, the second display unit, and the third display unit, respectively,
    a first overcurrent protection circuit to detect a current output from the first power supply, and to generate the first shut-down control signal when the detected current is greater than or equal to a reference current;
    a first short circuit protection circuit to detect a voltage level output from the first power supply, and to generate the first shut-down control signal when the detected voltage level is less than or equal to a reference voltage level; and
    a first OR gate connected to the first overcurrent protection circuit and the first short circuit protection circuit to output the first shut-down control signal generated from at least one of the first overcurrent protection circuit and the first short circuit protection circuit,
    wherein the controller is configured to supply the first image data to the third display unit in response to the first shut-down control signal, and to supply the second image data to the third display unit in response to the second shut-down control signal.

2. The vehicle display device of claim 1, wherein the first power supply comprises
    the first overcurrent protection circuit,
    the first short circuit protection circuit, and the first OR gate.

3. The vehicle display device of claim 2, wherein the first power supply is configured to output the first shut-down control signal to the controller when the first shut-down control signal is output from at least one of the first overcurrent protection circuit and the first short circuit protection circuit.

4. The vehicle display device of claim 3, wherein the first power supply further comprises a timer to detect a time during which the first shut-down control signal is generated, and
    the first power supply is configured to output the first shut-down control signal to the controller when the first shut-down control signal is detected for a predetermined reference time or more.

5. The vehicle display device of claim 1, wherein the second power supply comprises:
- a second overcurrent protection circuit to detect a current of the second power supply voltage output, and to generate the second shut-down control signal when the detected current is greater than or equal to a reference current;
- a second short circuit protection circuit to detect a voltage level of the second power supply voltage output, and to generate the second shut-down control signal when the detected voltage level is less than or equal to a reference voltage level, and
- a second OR gate connected to the second overcurrent protection circuit and the second short circuit protection circuit to output the second shut-down control signal generated from at least one of the second overcurrent protection circuit and the second short circuit protection circuit.

6. The vehicle display device of claim 5, wherein the second power supply is configured to output the second shut-down control signal to the controller when the second shut-down control signal is output from at least one of the second overcurrent protection circuit and the second short circuit protection circuit.

7. The vehicle display device of claim 6, wherein the second power supply further comprises a timer to detect a time during which the second shut-down control signal is generated, and
the second power supply is configured to output the second shut-down control signal to the controller when the second shut-down control signal is detected for a predetermined reference time or more.

8. The vehicle display device of claim 1, wherein the first power supply is configured to shut down based on the first shut-down control signal, and
the second power supply is configured to shut down based on the second shut-down control signal.

9. The vehicle display device of claim 1, wherein the first image corresponds to a left rear image of the vehicle,
the second image corresponds to a right rear image of the vehicle, and
the third image corresponds to an informational image of the vehicle.

10. The vehicle display device of claim 1, further comprising:
- a first camera disposed on a first side of an exterior of the vehicle, and configured to capture the first image to provide the first image data to the controller; and
- a second camera disposed on a second side of the exterior of the vehicle, and configured to capture the second image to provide the second image data to the controller.

11. The vehicle display device of claim 1, wherein the first image corresponding to the first image data is displayed on the third display unit when the first shut-down control signal is supplied to the controller.

12. The vehicle display device of claim 1, wherein the second image corresponding to the second image data is displayed on the third display unit when the second shut-down control signal is supplied to the controller.

13. The vehicle display device of claim 1, wherein the first image corresponding to the first image data and the second image corresponding to the second image data are simultaneously displayed on the third display unit when the first shut-down control signal and the second shut-down control signal are simultaneously supplied to the controller.

14. A method of driving a vehicle display device, the method comprising the steps of:
- supplying first image data corresponding to a first image to a first display unit disposed in a first portion of a vehicle;
- supplying second image data corresponding to a second image to a second display unit disposed in a second portion of the vehicle;
- supplying third image data corresponding to a third image to a third display unit disposed in a third portion of the vehicle;
- detecting a current of a first power supply voltage output from a first power supply and generating a first shut-down control signal when the detected current is greater than or equal to a reference current;
- detecting a voltage level of the first power supply voltage output from the first power supply and generating the first shut-down control signal when the detected voltage level is less than or equal to a reference voltage level;
- outputting the first shut-down control signal generated from at least one of detecting the current and the voltage level of the first power supply; and
- supplying the first image data to the third display unit in response to the first shut-down control signal.

15. The method of claim 14, wherein the first power supply shuts down based on the first shut-down control signal.

16. The method of claim 14, further comprising the steps of:
- detecting a current of a second power supply voltage output from a second power supply and generating a second shut-down control signal when the detected current is greater than or equal to a reference current;
- detecting a voltage level of the second power supply voltage output from the second power supply and generating the second shut-down control signal when the detected voltage level is less than or equal to a reference voltage level,
- outputting the second shut-down control signal generated from at least one of detecting the current and the voltage level of the second power supply, and
- supplying the second image data to the third display unit in response to the second shut-down control signal.

17. The method of claim 16, wherein the second power supply shuts down based on the second shut-down control signal.

18. The method of claim 16, wherein the first image data is provided by a first camera disposed on a first side of an exterior of the vehicle, and
the second image data is provided by a second camera disposed on a second side of the exterior of the vehicle.

19. The method of claim 16, wherein the first image corresponds to a left rear image of the vehicle,
the second image corresponds to a right rear image of the vehicle, and
the third image corresponds to an informational image of the vehicle.

* * * * *